(12) United States Patent
Sun

(10) Patent No.: US 7,778,191 B2
(45) Date of Patent: Aug. 17, 2010

(54) SYSTEM AND METHOD FOR FAST DETECTION OF COMMUNICATION PATH FAILURES

(75) Inventor: Jianli Sun, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 68 days.

(21) Appl. No.: 12/316,488

(22) Filed: Dec. 12, 2008

(65) Prior Publication Data
US 2010/0149996 A1   Jun. 17, 2010

(51) Int. Cl.
*H04L 12/26* (2006.01)
(52) U.S. Cl. .................. 370/244; 370/241; 370/242
(58) Field of Classification Search ............... 370/241, 370/242, 244
See application file for complete search history.

(56) References Cited

U.S. PATENT DOCUMENTS

| | | | |
|---|---|---|---|
| 6,816,483 B1 | 11/2004 | Beckstrom et al. | |
| 7,012,888 B2* | 3/2006 | Schoeneberger et al. | 370/217 |
| 7,120,688 B1 | 10/2006 | Nguyen et al. | |
| 7,599,359 B1* | 10/2009 | Croak et al. | 370/356 |
| 2004/0160979 A1* | 8/2004 | Pepin et al. | 370/462 |
| 2005/0232164 A1 | 10/2005 | Anzarouth et al. | |
| 2006/0002292 A1 | 1/2006 | Chang et al. | |
| 2006/0209682 A1* | 9/2006 | Filsfils et al. | 370/219 |
| 2007/0041527 A1* | 2/2007 | Tuchman et al. | 379/88.22 |
| 2007/0165533 A1* | 7/2007 | Wu | 370/242 |
| 2008/0025226 A1* | 1/2008 | Mogul et al. | 370/242 |
| 2009/0083455 A1* | 3/2009 | Sun et al. | 710/46 |
| 2009/0245234 A1* | 10/2009 | Parameswar et al. | 370/352 |
| 2010/0027416 A1* | 2/2010 | Beauford | 370/225 |

OTHER PUBLICATIONS

U.S. Appl. No. 11/903,438, filed Sep. 21, 2007, Sun et al.
IETF RFC 1122, "Requirements for Internet Hosts-Communication Layers", http://tools.ietf.org/html/rfc1122.
IETF RFC 4960, "Stream Control Transmission Protocol", http://tools.ietf.org/heml/rfc4960.
Nabil Seddigh, Mike Devetsikiotis, "Studies of TCP's Retransmission Timeout Mechanism", IEEE International Conference on Communications, pp. 1834-1840 vol. 6 Jun. 2001.
Vassilios Tsaoussidis et al., "TCP-Probing, Towards an Error Control Scheme with Energy and Throughput Performance Gain", Intrn'l Conf. Network Protocols, 12-21 Japan, Nov. 2000.
Sridhar Srinivasan et al., "M-coop: A Scalable Infrastructure for Network Measurement", Proceeding of the Third IEEE Workshop on Internet Applications, 2003.
Matthew Gillen et al., "Scalable, Adaptive, Time-Bounded Node Failure Detection", pp. i-iii, 10th IEEE High Assurance Systems Engineering Symposium (HASE'07), 2007.

\* cited by examiner

*Primary Examiner*—Chi H Pham
*Assistant Examiner*—Robert Lopata

(57) ABSTRACT

A system and methods for reducing detection time of path failures in a communications network is disclosed. Computing devices are organized into at least three groups based on their connectivity. The computing devices are assigned three identification values based on their group assignments. The identification values for each computing device are stored in a router connected to the communications network. Heartbeat packets are sent from the computing devices to the router on a periodic basis. If the router fails to receive a heartbeat packet from a particular computing device, a communication path from the router to the computing device is determined based on the three identification values.

20 Claims, 8 Drawing Sheets

SYSTEM AND METHOD FOR FAST DETECTION OF COMMUNICATION PATH FAILURES

BACKGROUND

In a VoIP system, the communication path between an internet protocol public branch exchange (iPBX) server and an internet protocol (IP) phone client is typically established using a transport protocol such as transmission control protocol (TCP) or user datagram protocol (UDP). For either case, an application-level heartbeat scheme has been a popular approach to monitoring the end-to-end path connectivity.

The timing of a typical heartbeat scheme can be determined based on a transmit timer value ($t_x$), a receive timer value ($t_r$), and the number of consecutive heartbeat misses (m) detected before declaring a particular path failure. These values can be summarized as ($t_x$, $t_r$, m). During operation, a heartbeat is usually sent after a $t_x$ timer has expired. A heartbeat miss event can be reported after a $t_r$ timer has expired. Any message transmitting activity can reset and restart the corresponding Tx timer. Any message receiving activity can reset and restart the corresponding RX timer.

It can be assumed that the delay time, $t_{delay}=t_r-t_x$, is system latency, which indicates an estimated maximum time required for a heartbeat to be delivered and processed from end to end along a network path. A default value can be considered to be similar to a TCP default value (3 seconds) of round-trip-time, therefore, it can be assumed that $t_{delay}=3$ seconds.

In view of the foregoing, it generally follows that $t_{delay}$ is the minimum or lower bound time required for detecting a heartbeat miss or path failure based in a typical heartbeat scheme.

In a one-way heartbeat model, only one side sends heartbeats; the other side listens for the heartbeats. The listening side asserts a heartbeat miss if its RX timer expired in $t_r$ seconds; it declares its path broken when m consecutive heartbeats are missed. The time required to detect a path failure in a one-way model is:

$$[(m-1) \times t_r + t_{delay}] < T \leq m \times t_r.$$

In a two-way heartbeat model, both sides exchange heartbeats independently. Both sides listen for heartbeats and monitor the path status.

In a typical iPBX client-server system shown in FIG. 1, without loss of generality, a two-way heartbeat model is illustrated with particular heartbeat values of ($t_x$, $t_r$, m)=(27, 30, 2).

Under the model illustrated in FIG. 1, the iPBX server 102 and IP phones 104 exchange heartbeats every 27 seconds over the TCP links 106. A heartbeat miss is reported if a TCP link has been idle for 30 seconds. Missing two consecutive heartbeats on a TCP link indicates that the link is down or the primary iPBX is not reachable. The phone can then start a failover process by closing the current TCP connection to the primary iPBX and establishing a new TCP connection to a secondary iPBX 108. The failure detection time $T_{detect}$ has been a crucial factor to system availability in an IP phone network. For any link, $T_{detect}$ is in the range of 33 seconds $\leq T_{detect} \leq$ 60 seconds, when m=2, 3 seconds $\leq T_{detect} \leq$ 30 seconds, when m=1.

An application-level heartbeat scheme, as discussed with respect to FIG. 1, is different from a TCP protocol stack scheme. One standard type of TCP protocol stack scheme is the Keepalive scheme. In this scheme, each Keepalive message expects a Keepalive acknowledgement (ACK) from a far-end of the path. If an ACK is not received after multiple retransmissions, path failure is asserted. TCP Keepalive is an optional feature of the TCP protocol. It is disabled by default. There are three parameters related to keepalive: tcp_keepidle, tcp_keepintvl, and tcp_keepretry.

The tcp_keepidle parameter specifies the interval of inactivity that causes TCP to generate a KEEPALIVE transmission for an application that requests it. tcp_keepidle defaults to 2 hours. The tcp_keepintvl parameter specifies the interval between the retries that are attempted if a KEEPALIVE transmission is not acknowledged. tcp_keepintvl defaults to 75 seconds. The tcp_keepretry is the number of retransmissions to be carried out before declaring that remote end is not available. tcp_keepretry defaults to 8.

The TCP Keepalive scheme is not designed for fast detection in a TCP link. It is a kernel-level controlled TCP stack that has system-wide behavior, which is not suitable for per-link or per-application interface purposes.

Another type of standard is the Stream Control Transmission Protocol (SCTP). The SCTP is a transport layer protocol used extensively in HTTP applications. SCTP transports multiple message-streams, whereas TCP transports a byte-stream. Both TCP and SCTP have similar retransmission mechanisms for reliable data transfer. Similar to TCP Keepalive, SCTP uses a simplified probing scheme to detect the path connectivity; it periodically sends "heartbeats" when no other data is being sent. If a heartbeat-ACK is not received after multiple retransmission efforts, a path failure is raised. The recommended heartbeat interval is 30 seconds. Clearly, the actual failure detection time is much longer than 30 seconds due to retransmission attempts.

In general, the path failure detection time of 30~60 seconds or more discussed above is too long for real-time service switch over (or failover) to a secondary iPBX. Reducing the heartbeat interval is typically not an effective method since it can create excessive network traffic overhead.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
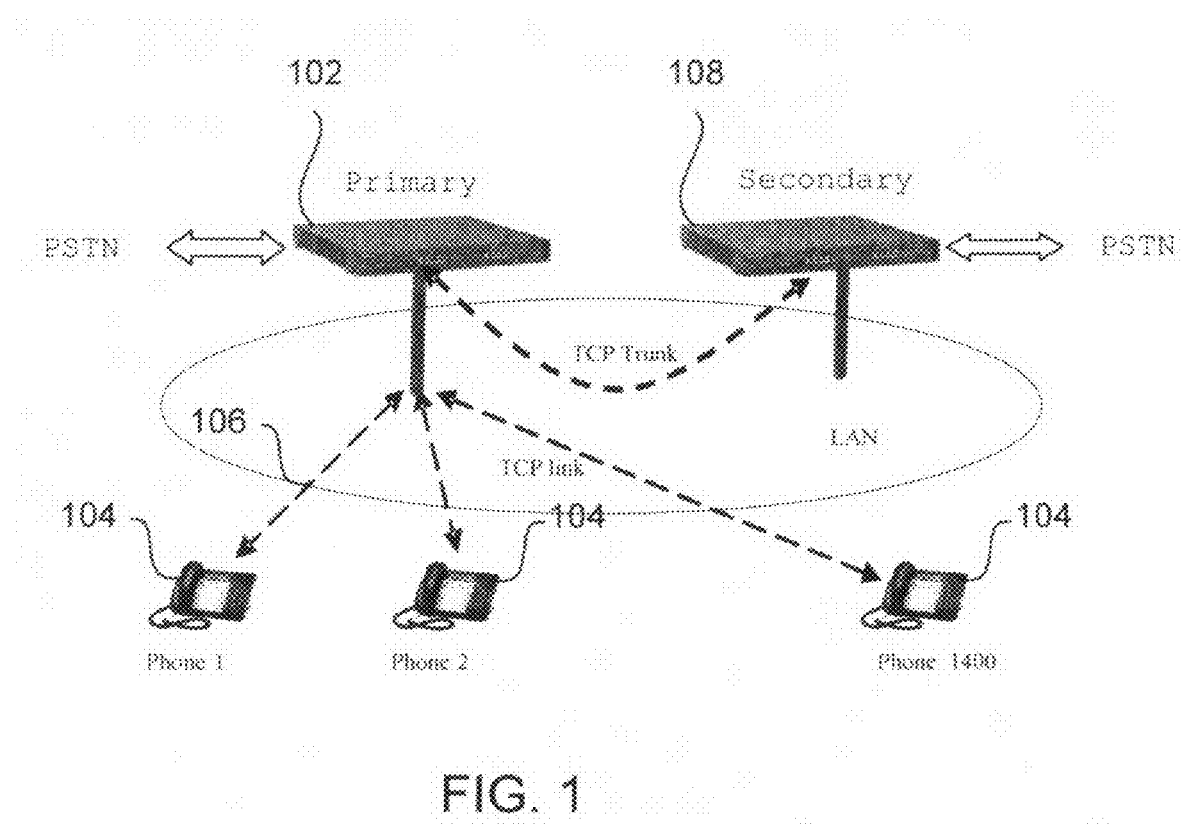
FIG. 1 is an illustration of a typical iPBX client-server system as known in the prior art.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The Invention

In one embodiment, a system and method are disclosed that provide an application-level and network protocol independent method for path failure detection in a large client-server system based on a generic heartbeat mechanism. The system can quickly detect a major network topology change, a large number of path failures, or a total loss of connectivity to an active server, such as an internet protocol public branch exchange (iPBX) server within a few seconds. This provides relatively fast transfer of the services from a primary iPBX to a secondary iPBX as compared to the time typically required and greatly improves an iPBX system's availability and reliability.

Figure 2:
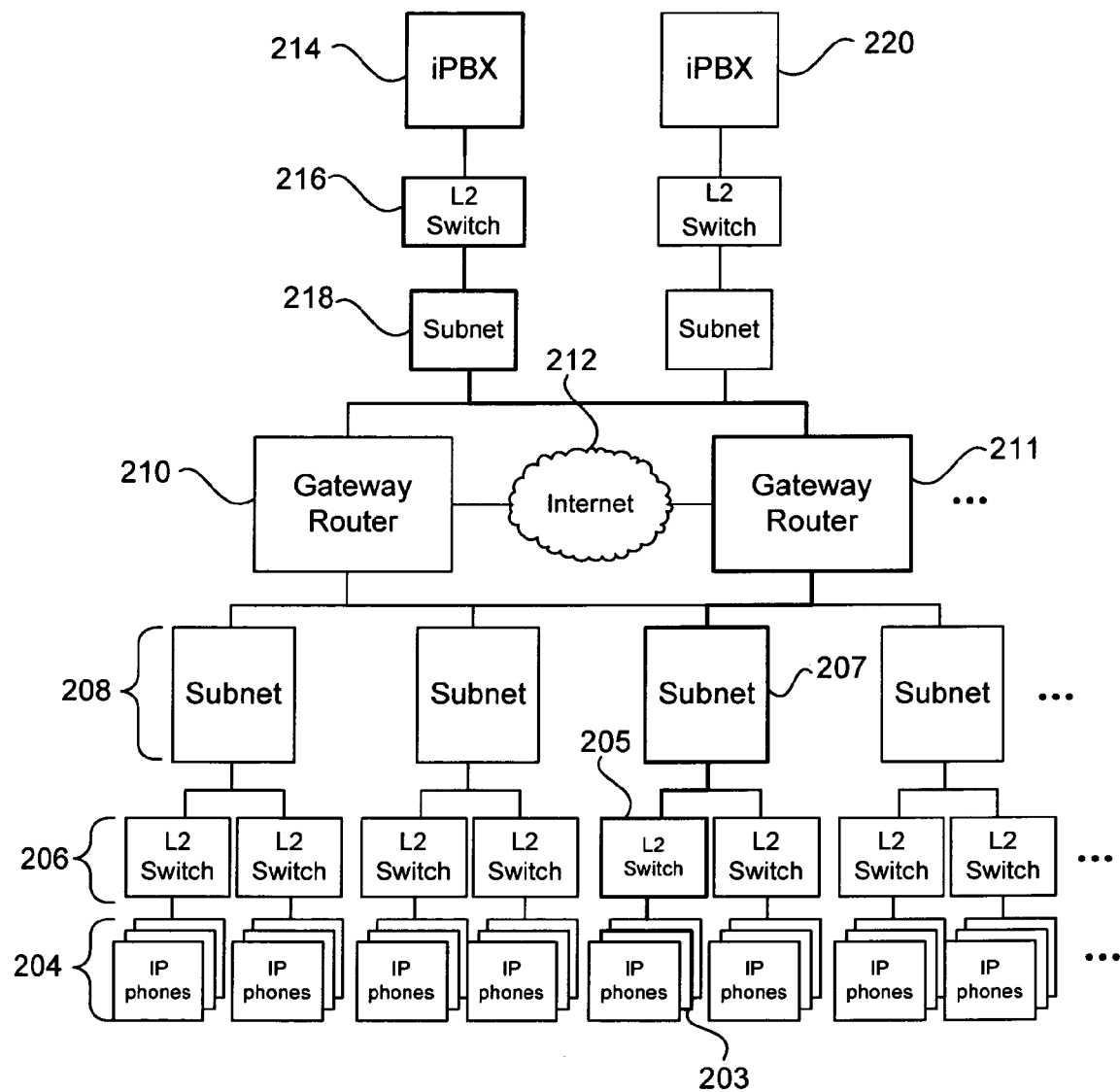
FIG. 2 is a block diagram of an exemplary iPBX communications system in accordance with an embodiment of the present invention.

With reference to FIG. 2, an exemplary communication network is shown comprising a communication switch 214, such as the MITEL MXE iPBX manufactured by Mitel Networks Corporation. The iPBX is connected through a network to a plurality of Internet Protocol (IP) telephones 204. In a typical configuration, a plurality of IP phones can be connected through a Layer 2 (L2) switch 206 to a subnet 208. Layer 2 is the data-link layer in the Open Systems Interconnection (OSI) model. The subnet may be a router or another L2 switch. Alternatively, the subnet 208 and the L2 switch 206 may be a single L2 switch. The L2 switch can be an Ethernet switch, or another type of layer 2 switch, as can be appreciated.

A plurality of subnets 208 can be connected to a gateway router 210. In a redundant system, more than one gateway router may be used. The gateway routers can also be connected to the internet 212. An iPBX server 214 can be connected to the gateway router 210 through an L2 switch 216 and subnet 218. A redundant iPBX 220 can also be included in the communications network. When necessary, the redundant iPBX may be used for switch-over or failover of IP phones and computing devices in the iPBX network. The communications network can be connected to the Public Switched Telephone Network (PSTN). A typical communications network can include 1400 or more IP phones connected to the iPBX. Many iPBX switches can form a cluster through a TCP trunk to support more IP phones; or form Primary/Secondary iPBX redundant pairs for providing resilient services.

The configuration of FIG. 2 is representative of a typical converged communication network, and that numerous variations in configuration, components, etc. are possible.

A standard LAN configuration contains a plurality of interconnected routers; each router connects a plurality of multiport L2 switches; and each L2 switch connects a plurality of IP devices or IP phones. As a result, the network access topology information (NATI) of an IP end device (such as an iPBX or IP phone) can be uniquely described by using this address hierarchy. For example, the network access topology information for each IP phone on a communications network can be assigned an identification based on a gateway IP address of the router, a subnet ID of the L2 switch segments, and an L2 port identification. That is, NATI=(Gateway ID,Subnet ID,L2 Port ID).

In the above, the Gateway ID can be the IP address of the gateway router; the Subnet ID can be the IP address of a subnet router or L2 switch; and the L2 Port ID can comprise two attributes: the L2 Port Media Access Control (MAC) address and the L2 Port Number.

In one embodiment of a MITEL VoIP system, an iPBX switch 214 is connected to an L2 switch 216, which is then connected to a gateway router 210, as shown in FIG. 2. An IP phone 204 can be connected to a desk-top hub, which is a shared media with other computers and desk-top devices. The hub is then connected to an L2 switch port 206. An L2 switch may have 48 ports (or even more ports). Many L2 switches forming a subnet 208 are further connected to a gateway router's 210 port, as previously discussed.

In one embodiment, the NATI can be detected by each IP phone. The NATI information can be communicated by each IP phone to the iPBX server during the standard phone registration process. As part of the device profile information, the L2 port information can also be used to provide emergency location detection if needed. After the phone registration, the phone can receive selected device configuration information from the iPBX. In particular, this device configuration information can include a heartbeat specification such as heartbeat timing information. The $t_x$ and $t_r$ values for the heartbeat timing information can be set. For example, the values may be set as ($t_x$=27, $t_r$=30, m=2), where $t_x$ is the transmit time between heartbeats, $t_r$ is the receive time for heartbeats, and m is the number of heartbeat misses until a path is declared broken. The IP phone can then start to exchange heartbeats with the iPBX. Both the iPBX and the IP phone can monitor the heartbeats. At any time, if two consecutive heartbeat misses are detected in this example, the path is declared as broken. This basic model can be considered as a standard process of two stages: (1) failure detection, wherein a heartbeat miss is detected; and (2) failure verification, wherein a consecutive heartbeat miss is detected.

Traditionally, the failure detection on each path takes 3<=T1<=30 seconds. Failure verification time takes an additional T2=30 seconds. That is, the total time required is between 33 and 60 seconds. In one embodiment, the system and method of the present invention can be used to decrease the total failure verification time to no more than a few seconds from the iPBX switch server side. For example, the total failure verification time can be less than seven seconds.

Path Failure Model and Analysis

In general, network path failures in a communications network can be classified into two categories: (1) single-path (SP) failures; and (2) multiple-path (MP) failures.

Based on topology of a voice over IP (VoIP) communications network, a single-path failure affecting only one phone is a rare case, which usually corresponds to a failure of the network section between the desk-top phone and the L2 switch. For example, a single path failure may be detected when a user unplugs a connection to an IP phone or reboots the phone. This type of failure typically has no severe impacts on the iPBX services to the rest of users in the communications network. Thus, there is little need to redirect communication services on the network from the primary iPBX to the secondary iPBX. The basic heartbeat mechanism is effective enough for detecting a single-path failure.

A multi-path (MP) failure is more common and severe, where many paths are broken at the same time. MP failures can be further classified into three categories:

MP1: A failure in the network on the segment between an iPBX and its gateway router, which breaks all IP phone paths, making the iPBX unreachable by thousands of phones connected to the iPBX.

MP2: A failure in the network on one subnet between a gateway router and a subnet, which may affect hundreds of IP phones within the subnet. The subnet may be a router or one or more L2 switches.

MP3: A failure in the network on an L2 switch, which may affect tens of IP phones connected locally to the L2 switch.

Obviously, the ability to quickly detect a failure, and the location of one or more failed paths in a communications network, is critical in maintaining a communications network having a high degree of reliability. The present invention provides various embodiments that can be used to quickly detect and verify all SP and MP failures.

Multi-Path Correlation Method for Fast Detection of Path Failures

A heartbeat miss of an IP phone located on a single path can be considered as a failure indication to a group of correlated paths. When a failure indication from a single IP phone is received, potential path failures along corresponding sets of paths can be quickly verified. The failure verification process for the corresponding paths can be started without waiting for possible individual heartbeat misses from IP phones located on each potential path failure. In order to quickly verify potential path failures, Path Correlation Groups (PCG) can be established. A path correlation group in a communications system can be based on the network access topology information of each phone in the communications network.

For example, in one embodiment, path correlation groups can be subdivided into three multi-path groups. These groups consist of:

phones under the same gateway that are assigned an identical MP1-ID;

phones under the same subnet that are assigned an identical MP2-ID; and phones under the same L2 switch that are assigned an identical MP3-ID.

When the IP phones are connected to the communications network, each phone can register with the iPBX. The registration process can include recording the MP1-ID, the MP2-

ID, and the MP3-ID of each connected IP phone at the iPBX. For every registered phone, the device control sub-system of the iPBX can create a phone object. A phone object can contain information related to the IP phone's unique Phone ID, IP Address, MAC address, TCP/IP Socket, NATI, and additional desired system information including the PCG values. Alternatively, the phone object can contain a link to said information.

To ensure rapid failure verification in a communications network, a predictable mechanism for failure indications in the network is used. Each IP phone can be configured to output a heartbeat within a configurable time interval designated as $[t_{delay}, (t_{delay}+T_{config})]$. In one exemplary embodiment, $t_{delay}=3$ seconds is the lower bound of the given heartbeat scheme. The actual amount of delay can be selected based on system design and traffic congestion in a communications network. The $T_{config}$ value can be selected based on the needs of the hardware in the communications network. For the sake of simplicity, it can be assumed that $T_{config}=1$ seconds in this example. That is, any multi-path failure can be detected in $3<=T1<=4$ seconds. This is a substantial improvement over the previously discussed range of 3 to 30 seconds.

A Heartbeat-Smoothing Method can be used to assist in providing a predictable mechanism for failure indication. The heartbeat-smoothing method can be integrated in a Heartbeat-Smoothing Module (HSM). The HSM can be used to ensure that the phones in each MP group transmit heartbeats in a sequential sequence so that heartbeats are streaming evenly over a selected time window. This can be done without the IP phones communicating with each other. In one example, the selected time window can have a value of $t_x=27$ seconds. More particularly, the HSM puts all phones in such an order that at least one phone from an MP group will send a heartbeat to the iPBX every $T_{config}$ periods. Using $T_{config}=1$ second time, if a network failure happens, in no more than $(t_{delay}+T_{config})=4$ second, at least one RX timer will expire, which indicates a heartbeat miss from a phone on that path.

Prior to describing the HSM, a description of the physical configuration conditions and a working condition of the Timer Manager provide helpful insight.

Since each IP phone in a particular MP group sends a heartbeat to the iPBX approximately every $t_x=27$ seconds, at least 27 phones can be assumed to be in each MP group in this example to enable a heartbeat to be sent once per second within the MP group. In general, this number of phones is not a problem for an MP1 gateway group or an MP2 subnet group, which are comprised of a relatively large number of aggregating groups of IP phones. For an MP3 group, this suggests that it is better to have 27 or more phones connected to an L2 switch. In practice, this is typically not a problem. L2 switches with 48 or more ports are commonly used to form the MP3 groups. In any case, even if a particular MP3 group has less than 27 phones (say 20 phones), it affects proportionally the failure detection time for the local phones within that group only by a small fraction.

Figure 3:
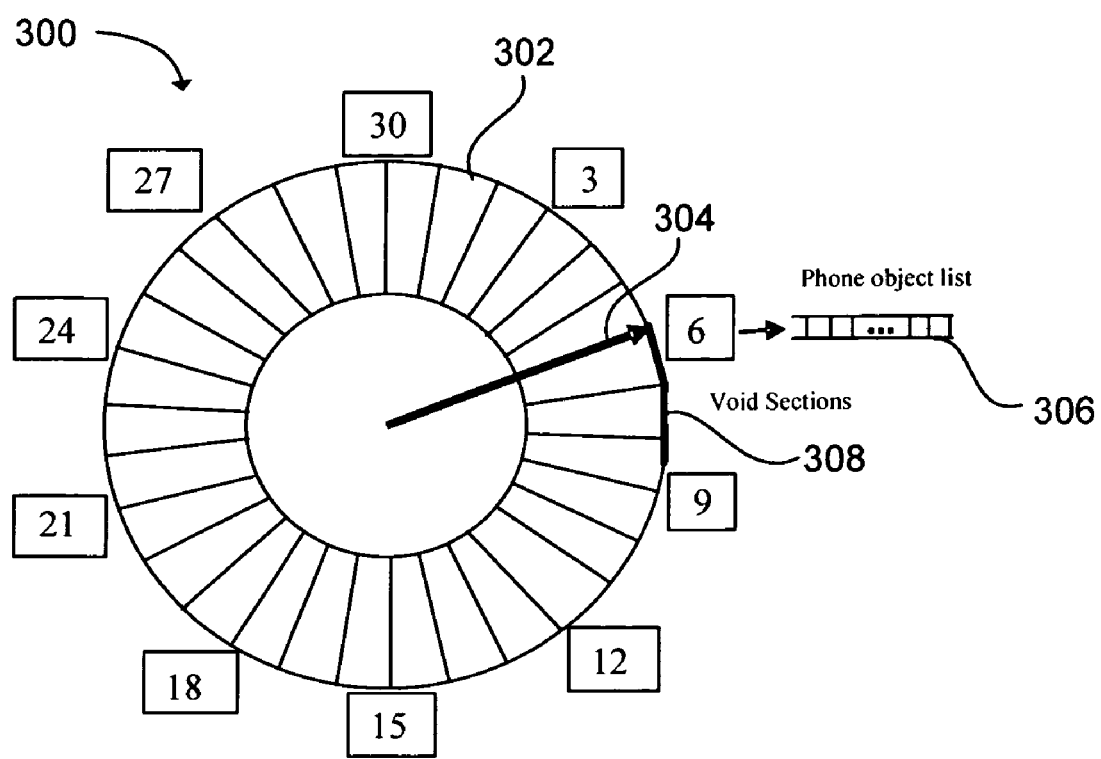
FIG. 3 is an illustration of a partitioned timer module in accordance with an embodiment of the present invention.

A timer manager can be used to control the timing of the RX timer within the iPBX and the TX timer within the IP phones connected to the iPBX. The timer manager can include a partitioned timer module 300 used to organize the monitoring of heartbeats received at the iPBX. FIG. 3 provides one exemplary illustration of the partitioned timer module. The timer manager, located in the iPBX, can monitor the timing of the heartbeats received at the iPBX by each of the computing devices or IP phones that are connected to the iPBX. In this example, an illustrated partitioned timer module is shown divided into a plurality of sections 302. A timer pointer 304 is configured to index through the sections in the partitioned timer module at a selected frequency. The timer pointer in this example is similar to a clock hand on an analog clock. The clock ticking granularity or the minimum timing unit of the pointer is flexible. In this example, it is selected as 10 milliseconds (ms). The actual granularity is dependent on the speed of the server hosting the timer manager. The granularity may range from tens of nanoseconds to tens of milliseconds. A smaller granularity enables the partitioned timer module to be updated more frequently.

While the example above discloses 27 phones in an MP3 group to enable a heartbeat to be received each second, this number is for illustration purposes only. In practice, thousands of heartbeats can be received at an iPBX each second. The frequency of heartbeats sent by each IP phone or computing device on a network is typically limited to reduce network traffic. However, with thousands or tens of thousands of IP phones connected to an iPBX, it is possible to receive and manage hundreds of heartbeats each second using the timer manager and the partitioned timer module 300.

As previously discussed, a phone object is created in the iPBX when an IP phone is connected to, and registers with, the iPBX. The phone object comprises an information record, or a link to an information record that is associated with an individual phone or other type of computing device. The information record contains information including the NATI record of the phone or computing device. Every section 302 of the timer manager can be associated with a specific phone object list 306. Alternatively, each clock tick position can be associated with a specific phone object list 306. Each phone object list can contain one or more phone objects for each IP phone or other type of computing device that has registered with the iPBX server. In this example, the timer ring is partitioned into M=30 sections ($M=t_x/T_{config}$). Assuming the granularity discussed above, each of the sections contains 100 clock-tick time units.

While the partitioned timer module 300 is shown as a ring in FIG. 3 for illustration purposes, it can be appreciated that the timer module can be implemented in any number of ways using software, firmware, and/or hardware. For example, the timer module may be implemented using a database configured to be accessed by the iPBX and associated computing devices connected to the iPBX. The phone objects may be stored at selected locations within the database. Thus, the partitioned timer module is not limited to the ring illustrated in FIG. 3. Implementation of the timer manager will be discussed more fully below.

Each computing device, or more specifically, each IP phone on the network connected to the iPBX, is configured to transmit a heartbeat to the iPBX at a periodic rate. The periodic rate is determined by a Tx timer internal to each IP phone or computing device, as previously discussed. The Tx timer can be setup to enable each IP phone to transmit a heartbeat every $t_x$ seconds. In one example, $t_x=27$ seconds. Additionally, the Tx timer can be reset whenever a signal or message is received at the IP phone from the iPBX and a heartbeat can be automatically generated and transmitted from the IP phone to the iPBX in response to the received signal or message. Thus, each IP phone can be configured to transmit a heartbeat to the iPBX approximately once every 27 seconds, or in response to a message received from the iPBX, whichever occurs sooner.

When the iPBX receives a heartbeat, or any message from an IP phone located on a certain path, the corresponding phone object can be removed from the phone object list 306. The phone object list is located at some position in the partitioned timer module. The removed phone object can then be newly appended to a phone object list in the section of the partitioned timer module at which the timer pointer is indexed (i.e., pointed to by the clock hand). This can be referred to as a message receiving operation (MRO).

In one exemplary embodiment, the timer pointer 304 can index through the 30 sections of the partitioned timer module 300 approximately once every 30 seconds (i.e. at a rate of approximately one second per interval). However, each IP phone is configured to send a heartbeat at least once every 27 seconds. Therefore, after an initial startup period, it can be assumed in a properly functioning network that the phone object lists in the three sections ahead of the timer pointer are empty. These sections can be referred to as void sections 308. In a properly functioning communications network, the phone object lists in the void sections are empty since each of the IP phones sent a heartbeat during the period when the timer pointer 304 was directed at one of the previous 27 sections in the partitioned timer module. When the heartbeat for each IP phone was received at the iPBX, the phone object associated with the IP phone was newly appended to the phone object list at which the timer pointer was indexed (i.e. directed).

A potential path failure module is configured to monitor each phone object list 306 at which the timer pointer 304 is indexed. When the timer pointer advances to the next section, it is assumed that the phone object list is empty. If one or more phone objects, which have not been newly appended, are still recorded in the phone object list, it means that the iPBX has not received a heartbeat in 30 seconds for the IP phones or computing devices associated with the phone objects. The identity and location of the IP phone, as well as the path along which the heartbeat travels, can be identified based on the information in the phone object record 306. A potential path failure is considered when one or more phone objects are recorded in a phone object list when the timer pointer advances.

For example, referring to FIGS. 2 and 3, when a phone object associated with a particular phone 203 is located in a phone object list 306 in a section 302 of the partitioned timer module 300 at the time at which the timer pointer 304 is indexed to that section, the NATI information associated with the phone object can be used to quickly determine the path between the IP phone 203 and the iPBX server 214. In this example, the path between the IP phone 203 and the iPBX 214 can be traced using the port number and/or MAC address of the L2 switch 205, the IP address of the subnet router 207, and the IP address of the gateway router 211.

While a potential path failure is considered when an IP phone has not sent a heartbeat in 30 seconds, the reason for the failure may be any number of events. In order to determine if there is a path failure, a heartbeat probing module can be used. The heartbeat probing module is configured to transmit a probing heartbeat from the iPBX to each particular IP phone contained on the phone object list when the timer pointer is indexed to the timer module section in which the phone object list is located. The probing heartbeat is configured to elicit a response heartbeat from each particular IP phone. The response heartbeat can be received at the iPBX to enable a path failure to be determined if no response heartbeat is received within a predetermined period.

In order to manage the number of heartbeats that are received at the iPBX to a reasonable number, a heartbeat smoothing module (HSM) can periodically check the RX timer manager's partitioned timer module to balance the distributions of phone objects so that each section of the ring has at least one phone object from each group of the MP3, MP2, and MP1 groupings. In one embodiment, the HSM can be configured to rebalance the distribution of phone objects in the phone object lists once every $T_{config}/2 = 0.5$ seconds. To balance the MP3 phone objects' distributions, the HSM can check how many phone objects from a particular MP3 group are in the current-time section that is pointed to by the timer pointer 304.

A smoothing operation can be used to move phone objects from other phone object lists 306 in other sections 302 of the partitioned timer module 300 that have more objects of the same MP3 group than the current-time section includes. After 30 seconds, the timer pointer will have traversed the entire ring and start at the beginning of the ring. The phone objects in the MP3 groups will be approximately evenly distributed between the phone object lists around the partitioned timer module. As time continues, the distribution evenness of phone objects of each MP3 group will be further optimized dynamically.

If a particular MP3 group contains 27 IP phones, and the smoothing operation evenly distributes the phone objects around the partitioned timer module, then it can be assumed that a heartbeat will be received at the iPBX from an IP phone in the particular MP3 group approximately once every second. Thus, the smoothing operation can be used to distribute the number of heartbeats received at the iPBX router. Additionally, the smoothing operation enables a heartbeat from each MP3 group to be received approximately once every second. This enables the path over which the heartbeats travel from the IP phones in each MP3 group to the iPBX to be monitored approximately once per second. Similarly, the distribution of phone objects in the partitioned timer module can be provided for phone objects in MP2 groups and MP1 groups by monitoring the distribution of phone objects in the phone object lists as the timer pointer progresses around the ring.

The smoothing operation assumes that the server iPBX and the client phones have a simple technique for synchronization. There are two simple approaches to achieving this. For the first approach, whenever the iPBX sends a probing heartbeat to a phone, the phone immediately replies with a heartbeat. In this case, the phone-end TX timer value should be slightly bigger than the 27 seconds of the iPBX-end TX timer value, i.e., $27 < t_x < 30$, in order to avoid that both ends send heartbeats at the same time. Equivalently, for the second approach, the iPBX sends a "Hello" message, the phone replies with a "Hello" message, where "Hello" is any application level message with null data. Without losing generality, the first approach can be used as a variant of the basic heartbeat scheme.

To illustrate the smoothing operation, in FIG. 3, it can be assumed that Section 21 has 5 more phone objects than average in a particular MP3 group. Section 6, the section at which the timer pointer 306 is indexed, has a count of phone objects in the particular MP3 group that is less than average by 4. The smoothing operation will then take four MP3 phone objects from Section 21, and send four heartbeats to their remote IP phones, respectively. The four IP phones will immediately reply with heartbeats. As described above, the arriving four heartbeats will move the four phone objects from Section 21 to Section 6, thereby evenly distributing the phone objects in the particular MP3 across the partitioned timer module.

It should be noted that the longest round-trip-time (RTT) of heartbeats is measurable and it is usually no more than a few milliseconds in typical iPBX networks.

Figure 4:
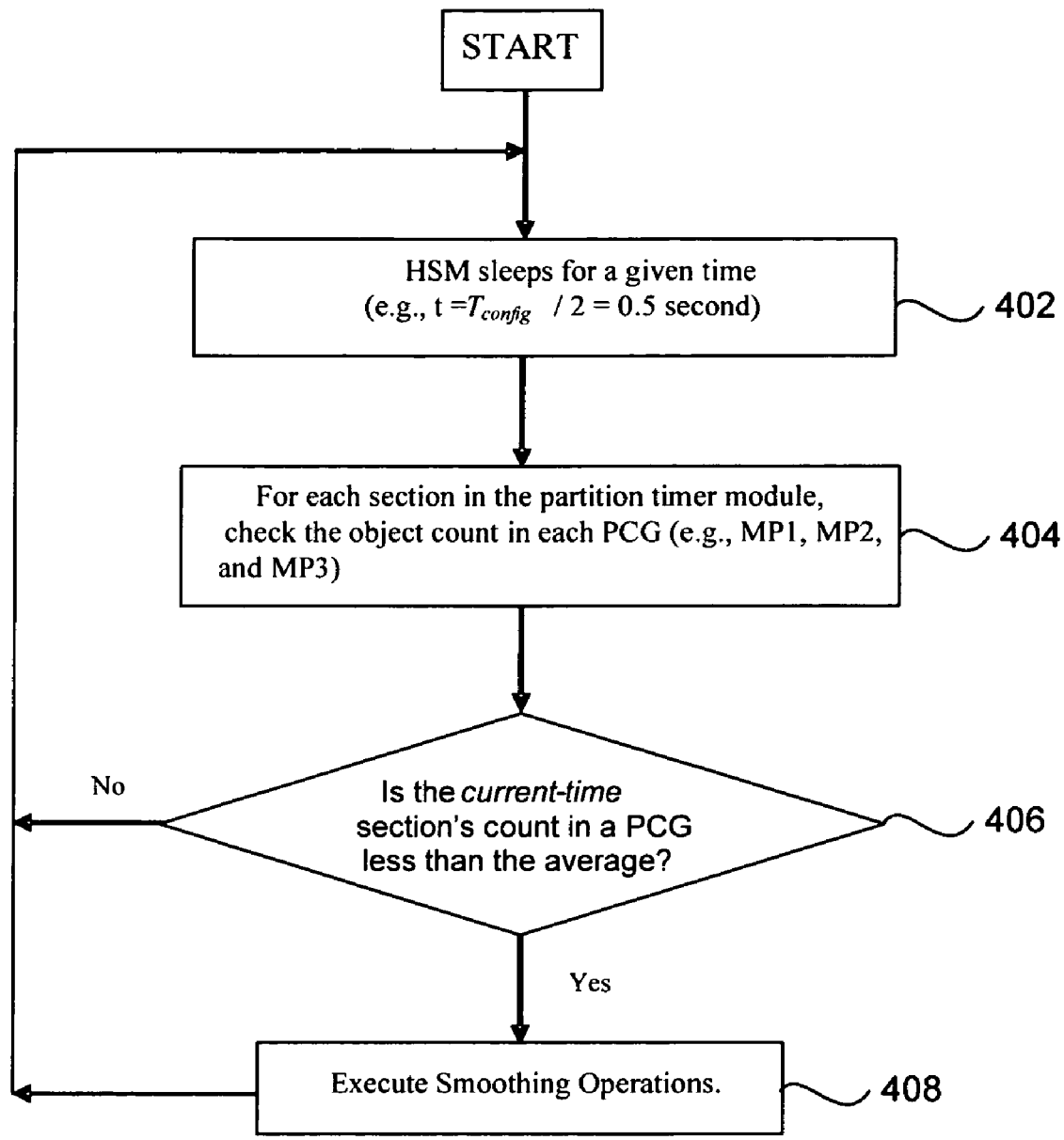
FIG. 4 is a flow chart depicting a heartbeat smoothing operation in accordance with an embodiment of the present invention.

One embodiment of a heartbeat smoothing method is depicted in the flowchart of FIG. 4. This method enables the path failure detection in a configurable time of $T_{config} = 1$ second for network failures of gateway-level type, subnet-level type, and L2 switch-level type. As depicted in block 402, a heartbeat smoothing module (HSM) can sleep for a selected period, such as one half the configuration time, or 0.5 seconds.

For each section in the partition timer module, the HSM can check the object count in each of the path correlation groups, such as the MP3 groups, the MP2 groups, and the MP1 groups, as shown in block 404. The HSM can determine if the section at which the timer pointer is indexed has a PCG count that is less than an average count of the plurality of sections in the partition timer module, as shown in block 406. If the average PCG count is greater than or equal to the average, then no action is taken. If the PCG count is less than the average PCG count, then smoothing operations are executed, as shown in block 408.

The smoothing operation involves sending a probing heartbeat to IP phones that have phone objects located on a phone object list with a greater than average PCG count. The IP phone can respond to the probing heartbeat with a heartbeat sent to the iPBX. The phone object can then be removed from the phone object list with the greater than average PCG count. The phone object can then be newly appended to the phone object list that has a less than average PCG count, thereby evenly distributing the phone objects in the partition timer module.

Heuristic Probing Method for Fast Verifying MP Failures

As previously discussed, after detecting a first heartbeat miss on a path, the heartbeat probing module can immediately test the path to confirm a single path failure. A single path failure can be determined by using the heartbeat probing module to send a heartbeat from the iPBX on the path to see if a heartbeat response can be received from the far end phone in a given probing time. A typical probing time can be approximately 500 milliseconds.

In FIG. 3, when the timer pointer 306 is indexed at section 6, if the phone object list on this position is not empty, then it indicates that heartbeats have not been detected at the iPBX for all IP phones having attached phone objects in the phone object list. In a typical heartbeat detection and path verification scheme, a path failure verification is not determined until a second heartbeat is missed. In this example, that would take an additional 30 seconds.

Heartbeat Probing Operation (HPO)

The heartbeat probing module can be used in conjunction with the partitioned timer module 300 to provide an improved failure verification process. For each phone object on the list, the probing operation can send a probing heartbeat on the corresponding path. Using the NATI information associated with the phone object, the path can be determined based on a knowledge of gateway router, the subnet, and the L2 switch used to communicate between the iPBX and the IP phone associated with the phone object.

After sending the probing heartbeat, the phone object can be moved to a phone object list at section 6.5. Usually, the round-trip-time of a heartbeat takes no more than a few milliseconds. Therefore, the period of 500 milliseconds is typically long enough to receive a heartbeat reply if the path is not broken. On the other hand, if the heartbeat reply is not received after the timer pointer is indexed to section 6.5, the phone object will experience the second heartbeat miss, which triggers a path failure confirmation. In this way, path failure verification is accomplished in approximately 0.5 seconds instead of 30 seconds in a typical heartbeat scheme. The actual round trip time can vary by network. The round trip time may range from less than 0.5 ms to greater than 750 ms, depending on network size, complexity, use, and so forth.

In the above timer-expiring case, for each list of phone objects, the path-correlation groups (i.e., MP3, MP2, and MP1) of the corresponding IP phones can be found from the NATI information stored in the phone object. Alternatively, the NATI information associated with each phone can be saved at a registered device Data Store 607 of the iPBX, which are built at the phone registration time. Each phone object can be associated with the information stored in the data store, thereby enabling the NATI for each IP phone to be determined. The heartbeat probing module can then send probing heartbeats from the iPBX to other phones in the same PCG group without waiting for potential expirations of their RX timers sometime in the next 30 seconds. This allows the scope of the problem to be determined more quickly.

Failure Prediction Operation (FPO)

In addition to the above, a failure prediction module (FPM) can intelligently look ahead of the timer ring to predict whether there is any potential heartbeat miss events outstanding. This is referred to as failure prediction operations. Since the heartbeats are exchanged every $t_x=27$ seconds in the example above, the 3-second void section 308 ahead of the current timer pointer 306 (e.g., between 6 and 9 in FIG. 3) is the system latency $t_{delay}=t_r-t_x$, where $t_r=30$ seconds. The system latency is sufficiently allocated to process the arriving heartbeats. In the failure-free situation, there must be some void sections (VS), which contain no pending phone objects waiting for heartbeats immediately ahead of any current clock time, as previously discussed.

The number of void sections can be calculated using the equation $VS=(t_r-t_x)-2RTT$, where RTT is the maximum round trip time of a signal in the iPBX network. In the previous examples, the round trip is considered to be less than 500 ms. Depending on the network traffic situations, the length of this section is variable. The actual round trip time may be as short as a few milliseconds or over a thousand milliseconds in a transcontinental communications network. The value of $t_r$ is typically selected to be a few seconds greater than the value of $t_x$ based on the actual round trip time of the system. For a round trip time of 500 ms, a lower bound of VS=2 seconds may be assumed for the heartbeat probing module in this example. Under a path failure indication, the FPM can first check to determine how many pending phone objects are still attached to phone object lists located in the VS zone 308. Since these phone objects represent IP phones or other computer devices for which heartbeats have not been received within the specified $t_x$ time period, the phone objects represent potential path failures. If the VS zone does have some phone objects, then the FPM can be used to confirm whether a potential path failure detected at the current timer pointer index section is a single failure case, or a more serious multi-path failure. Furthermore, the FPM can monitor the RX partitioned timer module 300 for collecting two important aspects of data:

1) The number of phone objects attached to phone object lists in the current VS zone (i.e., the sections in the VS zone) that will eventually report heartbeat misses.
2) The number of heartbeats or messages previously received for all of the phone objects on the RX partitioned timer module. This can be done by tracing how many newly appended (registered) phone objects have been added to the current-time pending list at this time interval.

The statistic results can be used to help to determine how many more failures can be detected and vote for a decision as to whether or not the current path failure is a large range of network failures. This information can be used by the system to determine whether to switch to backup network paths and devices to provide substantially uninterrupted service.

Failure Diagnostics Operation (FDO)

The iPBX server system may produce some system errors and warnings. For instance, socket errors that occur in reading and writing data are critical evidence to the path connectivity troubles. An FDO module can be used to check the server health status from the system maintenance records to determine if the server health is the source of the path failure indications.

Figure 5:
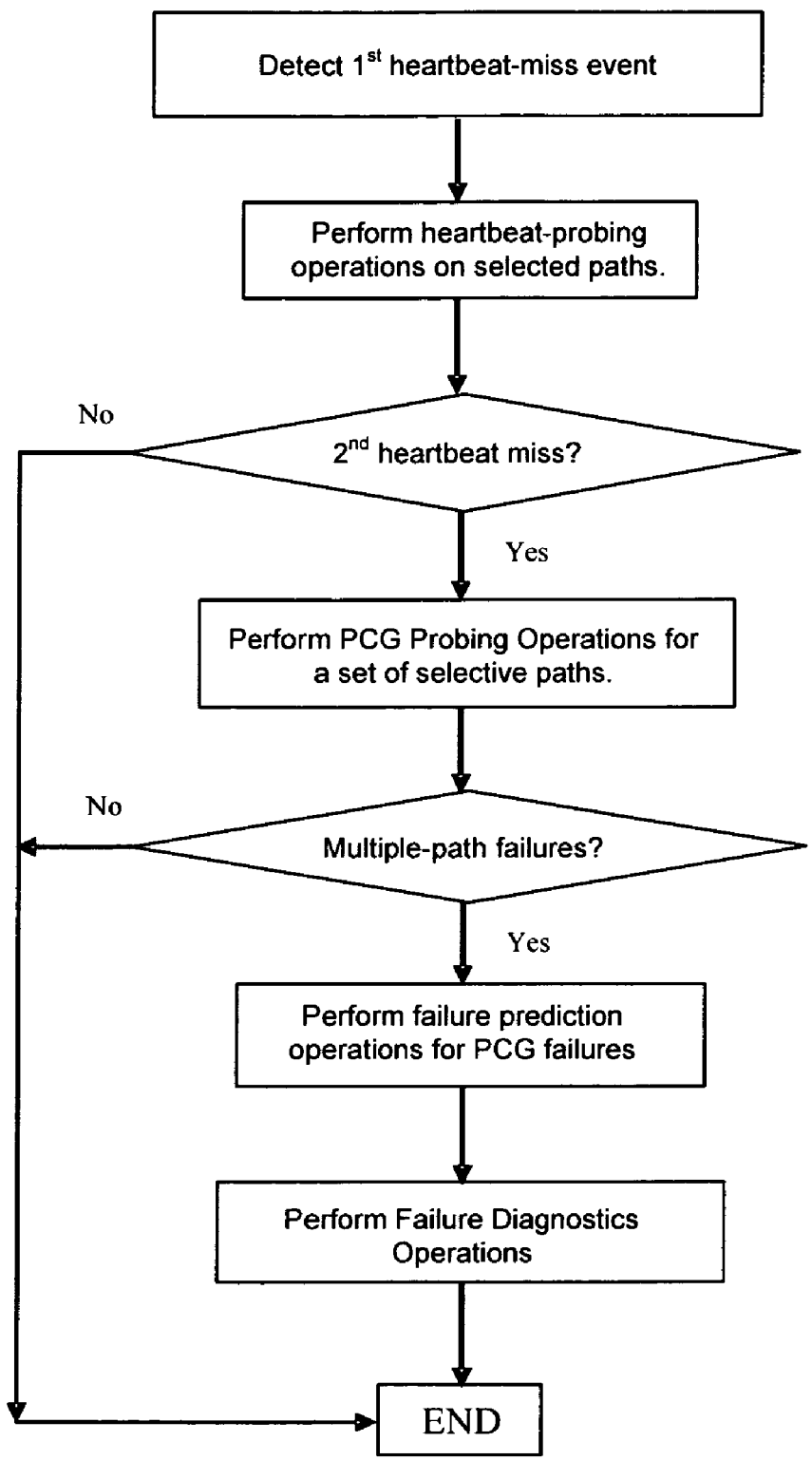
FIG. 5 is a flow chart depicting a process for verification of multi-path failures in a communications network in accordance with an embodiment of the present invention.

Referring now to FIG. 5 is shown a flow chart depicting an exemplary implementation of the operations that have been heretofore described. The HPM executes an integrated path failure verification algorithm by monitoring the phone object lists in the partitioned timer module as the timer pointer is indexed through the sections of the timer module. Upon detecting a first heartbeat miss, a Heartbeat Probing Operation is applied on the given path. Within a probing time of PT=0.5 second, if a heartbeat is received in response to the probing heartbeat, then the path is considered as failure-free. Otherwise, PCG Probing Operations are applied to a number of paths. Based on the NATI information of the one or more phone objects, probing heartbeats can be sent from the iPBX server to other IP phones that belong to:

the same MP3 group;
a different MP3 group, but the same subnet (i.e. the same MP2 group);
a different MP3 group and different subnet, but the same gateway-router (i.e. the same MP1 group);
a different MP3 group and different router-gateways.

In another probing time of PT=0.5 second, the probing results can be detected and used to help identify where the failure occurred. That is, the HPM can identify which pathways are affected based on which L2 switches, subnets, and gateway router paths have been broken. If all probing operations show negative results, then it is a sign that the failure is on an iPBX converging segment. In any case, failure predicting operations are executed to further verify the failures, which will be done in no more than another 3 seconds. In short, the whole verification process can be accomplished in about 4 seconds.

In the exemplary implementation shown in FIG. 5, all diagnostic operations can be conducted at application levels. Since the iPBX router gateway IP address and the IP phone's router gateway IP addresses are known from the NATI information, it is a feasible option to quickly perform a few transportation-level (e.g., TCP/IP) ping operations to check the connectivity from the iPBX to some routers in the network.

By collecting all the results of diagnostic operations shown above, the failure indication can be arbitrated as whether this is an intermittent event or a persistent path failure. Overall, path failure detection and verification for a complex system having over a thousand IP phones connected to an iPBX can take about 8 seconds in total. The overall time is dependent on the $t_x$ and $t_r$ timing values that are selected, the number of IP phones or computing devices in the MP3 group, and the amount of network traffic that affects the timing of heartbeats transmissions. The actual time can vary from less than 0.5 seconds for a relatively small iPBX network having less than 100 IP phones to 10-15 seconds for a large transcontinental network experiencing heavy traffic congestion. This provides a significant improvement over prior schemes that can take as long as 60 seconds.

System Architecture and Operation

In one exemplary implementation of the method, a MITEL IP phone having an embedded system running a real-time operating system on a platform with special processor, memory and disk is coupled to an iPBX through a network. To bring an offline IP phone on-line with an iPBX, there are three stages: (1) DHCP initial startup; (2) transport connection setup, and (3) device registration.

In the first stage of DHCP Initial Startup, the IP phone obtains its IP Address and iPBX list information from the DHCP server pre-configured in the LAN. The phone also receives its IP networking configuration and LAN configuration, which includes subnet mask, gateway IP address (Layer 3 router addresses), and TFTP server address for obtaining main phone load and phone configurations. Additionally, in order for the IP phones to detect where they are connected, the LAN is programmed to issue IEEE 802.1 Spanning Tree Protocol (STP). Each IP phone is configured to capture packets transmitted over the LAN in order to determine its IEEE Layer-2 peer connection (i.e., the Ethernet switch port MAC address and port number). That is, the network access topology information (NATI) is obtained at this stage.

In the second stage, a TCP Socket connection is established between the IP Phone and the iPBX. If a secured link is to be established, additional security negotiations are performed as well. This is the signaling path between the phone and iPBX.

In the Device Registration stage, the IP phone initiates a MITEL registration process with the iPBX. The IP phone sends a registration request message consisting of its unique MAC address together with other device information including NATI. If the bi-directional protocol transactions are successful, the IP phone will be put to in-service state by the iPBX. The IP phone is then ready to provide services.

A failure in an Ethernet switch or router (or a converged upper path segment starting from the iPBX) may affect multiple branches connected to many phones. A single or multi-path failure can be rapidly detected using the potential path failure module located in the iPBX. The potential path failure module can use the partitioned timer module to determine when a heartbeat has not been received by an IP phone connected to the iPBX. Additionally, the path of the heartbeat signal between the iPBX and the IP phone can be determined based on the NATI information stored in the iPBX. Potential path failures can be proactively checked by transmitting probing heartbeats from the iPBX to IP phones that failed to communicate. Additional probing heartbeats can be sent to other IP phones in the same MP3, MP2, and MP1 groups to quickly determine the scope of the potential path failure.

In another aspect, the failure prediction module located in the iPBX can be used to check whether IP phones in the P sections ahead of timer pointer in the partitioned timer module have successfully transmitted their heartbeats. Any phone objects in the phone object lists located in the P sections can be sent probing heartbeats for path failure verification. This can provide substantial time savings, by not requiring additional time to pass while waiting passively for IP phones to report.

Using the information obtained from the probing heartbeats, and the NATI information associated with each IP phone that has failed to report, the number of IP telephones that are not able to communicate on the iPBX network can be rapidly determined, usually within a matter of 4-8 seconds. Backup network paths and servers can be used to quickly restore service where possible.

System and Process Embodiments

Figure 6:
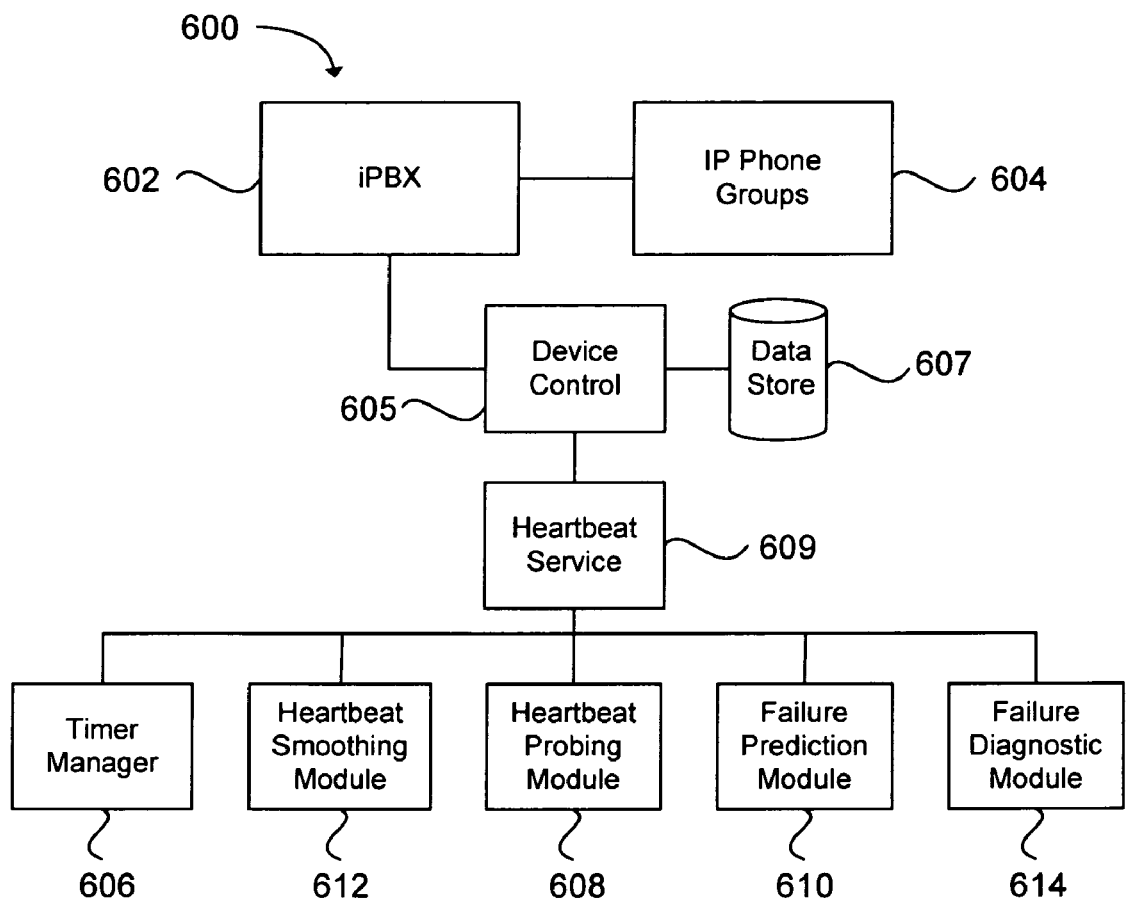
FIG. 6 is a block diagram illustrating a system for monitoring heartbeat packets in a telephone communications network in accordance with an embodiment of the present invention.

In one embodiment, a system 600 for monitoring heartbeat packets in a telephone communications network is disclosed, as illustrated in the block diagram of FIG. 6. The system includes an iPBX server 602 connected to a plurality of correlated groups (PCG groups) of internet protocol phones 604. The IP phones can be grouped into MP3, MP2, and MP1 groups, as previously discussed. Each group can include at least a number (N) of IP phones. The iPBX is configured to receive a heartbeat packet from each of the N IP phones in each group at least once every N intervals, where N is a positive integer. In the previous examples the value of N was set at 27. It can be appreciated that the number of IP phones in an MP3 group can be selected based on the needs of the system.

The system further includes a timer manager 606 operating in the iPBX server. The timer manager includes a partitioned timer module 300 (FIG. 3) having N+P sections, where P is a positive integer. In the previous examples, the value of P was selected as 3. The actual value can be selected based on the needs of the system, as previously discussed.

A timer pointer 304 indexes through the partitioned timer module 300 at a selected frequency. A phone object list 306 can be located in each of the N+P sections of the partitioned timer module. A separate phone object for each of the N IP phones is attached to one of the phone object lists in the partitioned timer module. The phone object is removed from the phone object list in the section in which it is located when a heartbeat packet from the associated IP phone is received at the iPBX. The phone object from the associated IP phone is then newly appended to a phone object list in the section at which the timer pointer is indexed. A potential path failure module is configured to monitor each phone object list at which the timer pointer is indexed. Each phone object that is on the phone object list that has not been newly appended is considered to be a potential path failure.

The system also includes a heartbeat probing module 608 that is configured to transmit a probing heartbeat from the iPBX 602 to each particular IP phone associated with a phone object contained on the phone object list 306 (FIG. 3) when the timer pointer 304 is indexed to the timer module section 302 in which the phone object list is located. The probing heartbeat is configured to elicit a response heartbeat from each of the particular IP phones such that the response heartbeat can be received at the iPBX to enable the potential path failure to be verified if no response heartbeat is received within a predetermined period.

The system can contain a failure prediction module 610 configured to intelligently look ahead of the timer pointer 304 in the partitioned timer module 300 to determine potential path failures for IP phones associated with phone objects contained on phone object lists in the P sections ahead of the timer pointer. The ability to look ahead enables a determination to be made as to which phone objects in the MP3, MP2, and MP1 groups have failed to send a heartbeat to the iPBX within the N intervals. This knowledge enables the failure prediction module to be used to determine the paths associated with the IP phones having phone objects in the P sections based on the IP phones MP1, MP2 and MP3 address (i.e. the NATI information).

The system can further include a heartbeat smoothing module 612. This module is configured to determine a number of phone objects in the phone object lists 306 of each of the segments 302 of the partitioned timer module 300. The number of phone objects can be reduced in segments with a greater than average number of phone objects. The reduction can be accomplished by transmitting a probing heartbeat from the iPBX to at least one IP phone having a phone object in the segment with a greater than average number of phone objects. The probing heartbeat can be transmitted when the timer pointer is directed to a segment of the partitioned timer module having a less than average number of phone objects.

When the at least one IP phone responds to the probing heartbeat and sends a heartbeat back to the iPBX, the at least one IP phone's corresponding phone object is removed from the segment having the greater than average number of phone objects and is newly appended to the segment having the less than average number of phone objects.

Thus, the heartbeat smoothing module can be used to enable a relatively steady number of heartbeats from the IP phones to be received at the iPBX. Phone objects associated with IP phones in each MP3 group, MP2, group, and MP1 group can be substantially evenly distributed about the sections in the partitioned timer module. The relatively even distribution of phones across the partitioned timer module provides a steady flow of information to the iPBX for each section of the communications network. This enables a communication disruption in one area of the network to be identified in a reasonably short period of time.

The system can also include a failure diagnostic module 614. The failure diagnostic module is configured to monitor a health status of at least one server in the iPBX communications network to enable a prospective source of the potential path failure to be discovered based on the server's reported health, as previously discussed.

In practice, the timer manager 606, and modules 608, 610, 612 and 614 are typically organized and operated in an iPBX under a heartbeat service 609. The heartbeat service is one service operated by a device control 605 operation in the iPBX. A data store 607 database or memory in communication with the device control 605 can be used to store the NATI information associated with each IP phone or computing device.

The various components and modules discussed above, such as the timer manager 606, the heartbeat probing module 608, the failure prediction module 610, the heartbeat smoothing module 612, and the failure diagnostic module 614 are shown and described separately to provide an exemplary illustration. However, the actual software code may be implemented in a number of ways, wherein the separate components of the system may be realized using various hardware, software, and firmware components as needed. The modules may be included in a single software program configured to operate on the iPBX, a remote server, or both.

Figure 7:
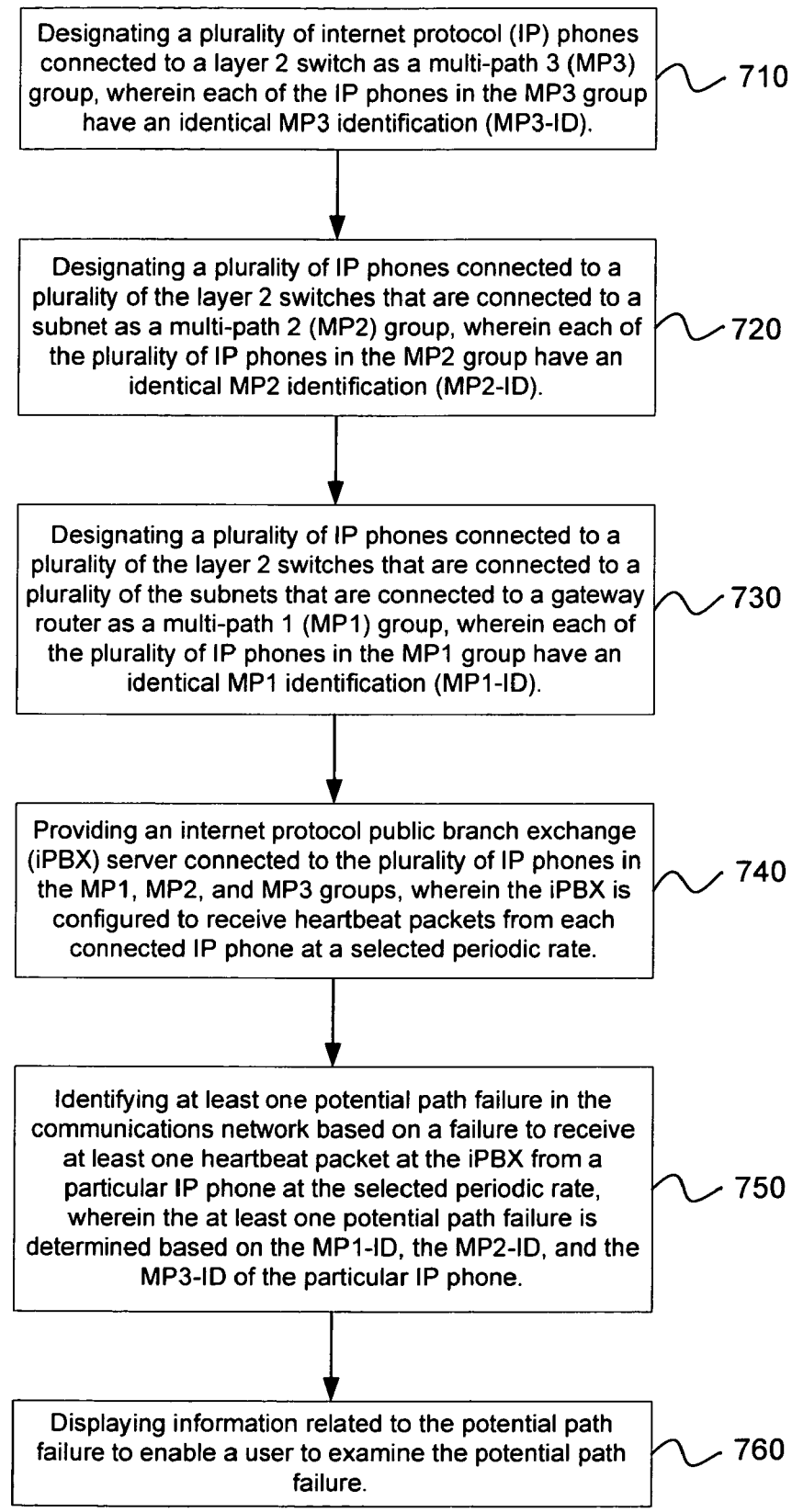
FIG. 7 is a flow chart depicting a method for reducing verification time of path failures in a telephone communications network in accordance with an embodiment of the present invention.

Another embodiment of the present invention provides a method 700 for reducing verification time of path failures in a telephone communications network, as depicted in the flow chart of FIG. 7. The method includes the operation of designating 710 a plurality of internet protocol (IP) phones connected to a layer 2 switch as a multi-path 3 (MP3) group. All IP phones in the MP3 group have an identical MP3 identification (MP3-ID). A plurality of IP phones connected to a plurality of the layer 2 switches that are also connected to a subnet can be designated 720 as a multi-path 2 (MP2) group. All IP phones in the MP2 group have an identical MP2 identification (MP2-ID). A plurality of IP phones connected to a plurality of the layer 2 switches that are connected to a plurality of the subnets that are connected to a gateway router are designated 730 as a multi-path 1 (MP1) group. All IP phones in the MP1 group have an identical MP1 identification (MP1-ID).

The method 700 further includes the operation of providing 740 an internet protocol public branch exchange (iPBX) server connected to the plurality of IP phones in the MP1, MP2, and MP3 groups. The iPBX is configured to receive heartbeat packets from each connected IP phone at a selected periodic rate. At least one potential path failure in the communications network is identified 750 based on a failure to receive at least one heartbeat packet at the iPBX from a particular IP phone at the selected periodic rate. The at least one potential path failure is determined based on the MP1-ID, the MP2-ID, and the MP3-ID of the particular IP phone. Information related to the potential path failure is displayed 760 to enable a user to examine the potential path failure.

The MP3-ID can be based on at least one of a media access control (MAC) address of the layer 2 switch and a layer 2 switch port ID. The MP2-ID can be based on an internet protocol address of the subnet. The MP1-ID can be based on an internet protocol address of the gateway router. The MP1-ID, the MP2-ID, and the MP3-ID for each IP phone connected to the iPBX can be stored in the iPBX.

At least one potential multi-path failure can be identified in the communications network based on the failure to receive at least one heartbeat packet at the iPBX from a plurality of IP phones at the selected periodic rate. The at least one potential multi-path failure is determined based on the MP1-ID, the MP2-ID, and the MP3-ID of the plurality of IP phones.

In one embodiment of the method 700, a number (N) of IP phones connected to a layer 2 switch can be designated as the MP3 group. Each of the NP IP pones in the MP3 group are configured to transmit a heartbeat packet to the iPBX server at a rate of approximately once every T periods, where N is a positive integer and T is a positive real number. The N IP phones can be synchronized such that one of the N IP phones transmits its heartbeat packet approximately ever T/N periods to enable the iPBX server to receive a heartbeat packet from the MP3 group about every T/N periods. In the previous examples, the values of N and T were set at 27 to enable each of the N IP phones to send a heartbeat packet every 27 seconds. The synchronization enables a heartbeat packet to be received every second at the iPBX. Obviously, other values can be selected based on the needs of the communication system to enable the IP phones to report at a desired rate at the iPBX.

In another embodiment of the method 700, a probing heartbeat can be transmitted from the iPBX to the particular IP phone when the failure to receive at least one heartbeat packet at the iPBX from the particular IP phone is determined. The probing heartbeat is configured to elicit a response heartbeat from the particular IP phone that can be received at the iPBX to enable a path failure to be verified if no response heartbeat is received at the iPBX within a predetermined period. Additional probing heartbeats can be transmitted to at least one additional IP phone in the same MP3 group as the particular IP phone to determine whether a communications path connected to the MP3 group has failed. Moreover, additional probing heartbeats can be transmitted from the iPBX to at least one additional IP phone in the same MP2 group and the same MP1 group as the particular IP phone to determine whether a communications path connected to at least one of the MP1 and MP2 groups has failed.

While many specific examples have been given regarding verification of path failures in a communications network having a plurality of IP phones connected to an iPBX server, the systems and methods disclosed can also be used for fast verification of path failures in a more general communications network having a plurality of computing devices connected together.

Figure 8:
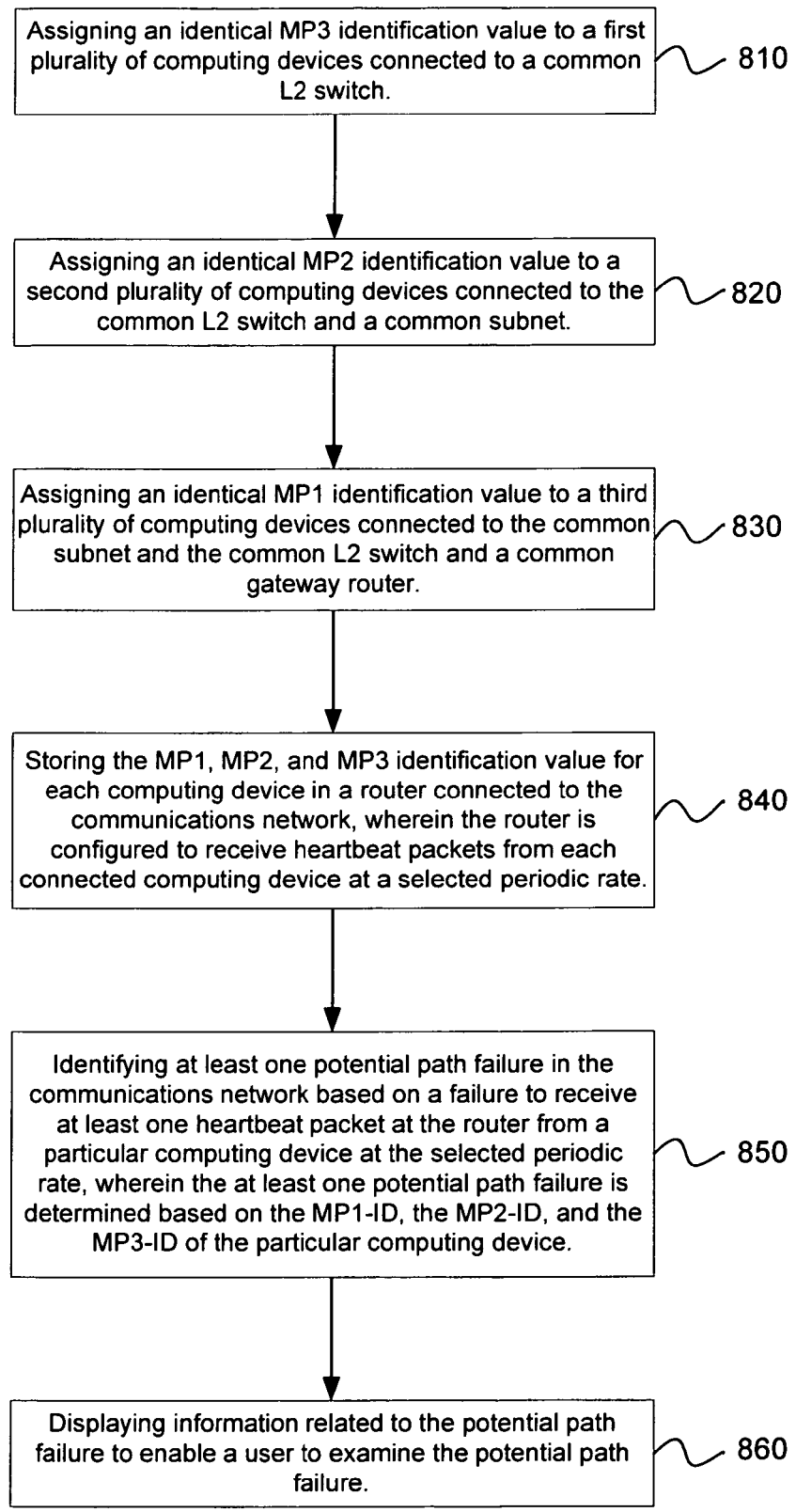
FIG. 8 is a flow chart depicting a method for reducing verification time of path failures in a communications network in accordance with an embodiment of the present invention.

Another embodiment of the present invention provides a method 800 for fast verification of path failures in a communications network, as depicted in the flow chart of FIG. 8. The method includes the operation of assigning 810 an identical MP3 identification value to a first plurality of computing devices connected to a common L2 switch. An identical MP2 identification value can be assigned 820 to a second plurality of computing devices connected to the common L2 switch and a common subnet. An identical MP1 identification value can be assigned 830 to a third plurality of computing devices connected to the common subnet and the common L2 switch and a common gateway router.

The method 800 further includes storing 840 the MP1, MP2, and MP3 identification value for each computing device in a router connected to the communications network, wherein the router is configured to receive heartbeat packets from each connected computing device at a selected periodic rate. At least one potential path failure in the communications network is identified based on a failure to receive at least one heartbeat packet at the router from a particular computing device at the selected periodic rate, wherein the at least one potential path failure is determined based on the MP1-ID, the MP2-ID, and the MP3-ID of the particular computing device.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for reducing identification time of path failures in a telephone communications network, comprising:
    designating a plurality of internet protocol (IP) phones connected to a layer 2 switch as a multi-path 3 (MP3) group, wherein each of the IP phones in the MP3 group have an identical MP3 identification (MP3-ID);
    designating a plurality of IP phones connected to a plurality of the layer 2 switches that are connected to a subnet as a multi-path 2 (MP2) group, wherein each of the plurality of IP phones in the MP2 group have an identical MP2 identification (MP2-ID);
    designating a plurality of IP phones connected to a plurality of the layer 2 switches that are connected to a plurality of the subnets that are connected to a gateway router as a multi-path 1 (MP1) group, wherein each of the plurality of IP phones in the MP1 group have an identical MP1 identification (MP1-ID);
    providing an internet protocol public branch exchange (iPBX) server connected to the plurality of IP phones in the MP1, MP2, and MP3 groups, wherein the iPBX is configured to receive heartbeat packets from each connected IP phone at a selected periodic rate;
    identifying at least one potential path failure in the communications network based on a failure to receive at least one heartbeat packet at the iPBX from a particular IP phone at the selected periodic rate, wherein the at least one potential path failure is determined based on the MP1-ID, the MP2-ID, and the MP3-ID of the particular IP phone; and
    displaying information related to the potential path failure to enable a user to examine the potential path failure.

2. A method as in claim 1, further comprising identifying at least one potential multi-path failure in the communications network based on the failure to receive at least one heartbeat packet at the iPBX from a plurality of IP phones at the selected periodic rate, wherein the at least one potential multi-path failure is determined based on the MP1-ID, the MP2-ID, and the MP3-ID of the plurality of IP phones.

3. A method as in claim 1, further comprising providing the MP3-ID based on at least one of a media access control (MAC) address of the layer 2 switch and a layer 2 switch port ID, the MP2-ID based on an internet protocol address of the subnet, and the MP1-ID based on an internet protocol address of the gateway router.

4. A method as in claim 1, further comprising storing the MP1-ID, the MP2-ID, and the MP3-ID for each IP phone in the iPBX to which the IP phone is connected.

5. A method as in claim 1, further comprising designating a number (N) of IP phones connected to a layer 2 switch as the MP3 group, wherein each of the N IP phones in the MP3 group are configured to transmit a heartbeat packet to the iPBX server at a rate of approximately once every T periods, where N is a positive integer and T is a positive real number, and the N IP phones are synchronized such that one of the N IP phones transmits its heartbeat packet approximately every T/N periods to enable the iPBX server to receive a heartbeat packet from the MP3 group about every T/N periods.

6. A method as in claim 1, further comprising transmitting a probing heartbeat from the iPBX to the particular IP phone when the failure to receive at least one heartbeat packet at the iPBX from the particular IP phone is determined, wherein the probing heartbeat is configured to elicit a response heartbeat from the particular IP phone that can be received at the iPBX to enable a path failure to be verified if no response heartbeat is received at the iPBX within a predetermined period.

7. A method as in claim 6, further comprising transmitting additional probing heartbeats to at least one additional IP phone in the same MP3 group as the particular IP phone to determine whether a communications path connected to the MP3 group has failed.

8. A method as in claim 6, further comprising transmitting additional probing heartbeats from the iPBX to at least one additional IP phone in a same MP2 group and a same MP1 group as the particular IP phone to determine whether a communications path connected to at least one of the MP2 and MP1 groups has failed.

9. A system for monitoring heartbeat packets in a telephone communications network, comprising:
   an internet protocol public branch exchange (iPBX) server connected to a plurality of groups of internet protocol (IP) phones, wherein each group includes at least a number (N) of IP phones and the iPBX is configured to receive a heartbeat packet from each of the N IP phones in each group at least once every N intervals, wherein N is a positive integer; and
   a timer manager operating in the iPBX server, comprising:
      a partitioned timer module having N+P sections, with a timer pointer indexing through the timer module at a selected frequency, wherein P is a positive integer;
      a phone object list located in each of the N+P sections;
      a separate phone object for each of the N IP phones in each group is attached to one of the phone object lists in the partitioned timer module, wherein the phone object is removed from the phone object list in the section in which it is located when a heartbeat packet from the associated IP phone is received at the iPBX and the phone object is newly appended to a phone object list in the section at which the timer pointer is indexed;
      a potential path failure module configured to monitor each phone object list at which the timer pointer is indexed, wherein each phone object that is on the phone object list that has not been newly appended is considered to be a potential path failure.

10. A system as in claim 9, further comprising a heartbeat probing module configured to transmit a probing heartbeat from the iPBX to each particular IP phone associated with a phone object contained on the phone object list when the timer pointer is indexed to the timer module section in which the phone object list is located, wherein the probing heartbeat is configured to elicit a response heartbeat from each of the particular IP phones such that the response heartbeat can be received at the iPBX to enable the potential path failure to be verified if no response heartbeat is received within a predetermined period.

11. A system as in claim 9, further comprising a failure prediction module configured to intelligently look ahead of the timer pointer to determine potential path failures for IP phones associated with phone objects contained on phone object lists in the P sections ahead of the timer pointer.

12. A system as in claim 11, wherein the plurality of groups include IP phones in an MP3 group connected to a common L2 switch, IP phones in an MP2 group connected to a common subnet, and IP phones in an MP1 group connected to a common gateway router.

13. A system as in claim 12, wherein at least N segments of the timer module include a phone object on their respective phone object lists from each of the MP3, MP2, and MP1 groups.

14. A system as in claim 13, wherein the failure prediction module is configured to determine at least one path failure by accessing the phone objects in the P sections ahead of the timer pointer to determine which phone objects in the MP3, MP2, and MP1 groups have failed to send a heartbeat to the iPBX within the N intervals to allow the failure prediction module to determine the paths associated with the IP phones having phone objects in the P sections based on the IP phones MP1, MP2, and MP3 address.

15. A system as in claim 9, further comprising a heartbeat smoothing module configured to provide a substantially same number of phone objects in each phone object list in the N segments of the timer module to provide a substantially balanced timer ring module.

16. A system as in claim 15, wherein the heartbeat smoothing module is configured to determine a number of phone objects in the phone object lists of each of the segments of the timer module and to reduce a number of phone objects in segments with a greater than average number of phone objects by transmitting a probing heartbeat from the iPBX to at least one IP phone having a phone object in the segment with the greater than average number of phone objects when the timer pointer is directed to a segment having a less than average number of phone objects to thereby remove the phone object from the segment having the greater than average number of phone objects and insert the phone object associated with the at least one IP phone into the segment having the less than average number of phone objects when the at least one IP phone responds to the probing heartbeat and the phone object is newly appended to the segment having the less than average number of phone objects.

17. A system as in claim 15, wherein the heartbeat smoothing module is further configured to provide a substantially same number of phone objects associated with IP phones in an MP3 group connected to a common L2 switch, IP phones in an MP2 group connected to a common subnet, and IP phones in an MP1 group connected to a common gateway router, such that a substantially same number phone objects in each of the MP3, MP2, and MP1 groups are in each of the N segments.

18. A system as in claim 9, further comprising a failure diagnostic module configured to monitor a health status of at least one server in the communications network to enable a prospective source of the potential path failure to be discovered.

19. A method for reducing identification time of path failures in a communications network, comprising:
- assigning an identical MP3 identification value to a first plurality of computing devices connected to a common L2 switch;
- assigning an identical MP2 identification value to a second plurality of computing devices connected to the common L2 switch and a common subnet;
- assigning an identical MP1 identification value to a third plurality of computing devices connected to the common subnet and the common L2 switch and a common gateway router;
- storing the MP1, MP2, and MP3 identification value for each computing device in a router connected to the communications network, wherein the router is configured to receive heartbeat packets from each connected computing device at a selected periodic rate; and
- identifying at least one potential path failure in the communications network based on a failure to receive at least one heartbeat packet at the router from a particular computing device at the selected periodic rate, wherein the at least one potential path failure is determined based on the MP1-ID, the MP2-ID, and the MP3-ID of the particular computing device.

20. A method as in claim 19, further comprising providing the MP3-ID based on at least one of a media access control (MAC) address of the layer 2 switch and a layer 2 switch port ID, the MP2-ID based on an internet protocol address of the subnet, and the MP1-ID based on an internet protocol address of the gateway router.

* * * * *